United States Patent
Ufheil et al.

(10) Patent No.: US 6,698,625 B2
(45) Date of Patent: Mar. 2, 2004

(54) MIXING AND FROTHING DEVICE AND METHOD

(75) Inventors: Gerhard Ufheil, New Milford, CT (US); Romanus Eduard Verhoeven, Heerhugowaard (NL)

(73) Assignee: Nestec S.A., Vevey (CH)

( * ) Notice: Subject to any disclaimer, the term of this patent is extended or adjusted under 35 U.S.C. 154(b) by 86 days.

(21) Appl. No.: 10/073,643

(22) Filed: Feb. 11, 2002

(65) Prior Publication Data

US 2003/0150879 A1 Aug. 14, 2003

(51) Int. Cl.[7] ............................................. B67D 5/58
(52) U.S. Cl. .................... 222/190; 222/235; 222/129.1; 222/145.5
(58) Field of Search ............................. 222/190, 129.1, 222/146.5, 145.5, 235, 333, 236; 366/244, 241, 247, 249, 251, 279

(56) References Cited

U.S. PATENT DOCUMENTS

| 4,185,927 | A | * | 1/1980 | Uttech .......................... 366/131 |
| 4,620,953 | A | | 11/1986 | Silla et al. .................... 261/142 |
| 4,676,401 | A | * | 6/1987 | Fox et al. ........................ 222/1 |
| 4,903,585 | A | | 2/1990 | Wimmers et al. .............. 99/275 |
| 4,949,631 | A | | 8/1990 | Fregnan ......................... 99/452 |
| 5,192,002 | A | * | 3/1993 | Reese et al. ................. 222/108 |
| 5,509,349 | A | | 4/1996 | Anderson et al. ........... 99/323.1 |
| 5,918,768 | A | | 7/1999 | Ford ............................ 222/113 |
| 5,927,553 | A | | 7/1999 | Ford ......................... 222/129.4 |
| 5,931,080 | A | | 8/1999 | Roure Boada ................ 99/293 |
| 6,267,496 | B1 | | 7/2001 | Real ............................ 366/132 |
| 6,325,117 | B1 | | 12/2001 | Burke et al. ................. 141/392 |

FOREIGN PATENT DOCUMENTS

| DE | 38 38 683 A1 | 5/1990 |
| EP | 1 116 464 A1 | 7/2001 |
| GB | 1006191 | 9/1965 |

OTHER PUBLICATIONS

Bravilor Bonamat whipper manual, 2 pages.
Rhea whipper Installation and Maintenance Manual, p. 54.
Zanussi whipper manual, 1 page.

* cited by examiner

Primary Examiner—Gene Mancene
Assistant Examiner—Frederick C. Nicolas
(74) Attorney, Agent, or Firm—Winston & Strawn LLP

(57) ABSTRACT

The invention relates to a mixing device with an input container that is configured for receiving a product that includes a fluid component and a second component. A whipper with a conical whipper surface has an axis is configured for aerating and frothing the product. The whipper surface extends between first and second end portions, with the first end portion having a smaller diameter than the second end portion. The whipper surface is preferably oriented at a surface angle to the axis of about between 5° and 65°. A motor is in driving association with the whipper for rotating the whipper about the axis at a speed sufficient for aerating and frothing the product. A product exit conduit is disposed downstream of the whipper and is configured for dispensing the product of the fluid and second components.

25 Claims, 3 Drawing Sheets

MIXING AND FROTHING DEVICE AND METHOD

FIELD OF THE INVENTION

The present invention relates to a mixing device that provides a frothy fluid product. More particularly, the invention relates to a mixing device for mixing, frothing, and dispensing a beverage, and to a method for providing a frothy fluid product.

BACKGROUND OF THE INVENTION

Espresso and other coffee and milk drinks are often prepared by mixing a powder in water. Traditionally, a milk froth is provided to the drink by steam frothing.

Mixing devices are known for speedier preparation of such beverages and other foods by mixing a powdered food component with a liquid, such as water. These devices typically feed the powdered component into the water, which is often pumped tangentially into a mixing chamber to create a whirlpool to mix the powder into the water. The mixture is then fed to a whipping mechanism, which is usually a rotating plate. The plate aerates the mixture and produces a froth. The frothed mixture is usually dispensed into a container for drinking.

U.S. Pat. No. 5,927,553, for example, discloses a mixing and dispensing apparatus with a cruciform frothing blade. Other shapes of frothing blades are also known. For instance, companies such as Rhea and Zanussi use whippers with an axially short disk with very steep sloped walls. Other whippers have rotors with independent ramps extending from a substantially flat plate. The known devices generally have their greatest efficiency for preparing a small group of products.

There is a need for a mixing device with an improved frothing effect and efficiency. The present invention satisfies this need.

SUMMARY OF THE INVENTION

The invention relates to a mixing device with high versatility, as it is able to very effectively aerate and froth different products, such as coffee and milk products, for serving in a cup. A preferred embodiment of the device has an input container configured for receiving a product that comprises a fluid component and a second component. A whipper is provided in a housing of the device with a conical whipper surface that has an axis and that is configured for aerating and frothing the product. The whipper surface extends between first and second end portions of the whipper. The first end portion has a first diameter and is in fluid communication with the input container to receive the product. The second end portion is disposed downstream of the first end portion and has a second diameter that is larger than the first diameter. The whipper surface of this embodiment is oriented at an angle to the axis of about between 5° and 65°, more preferably about between 10° and 45°, and most preferably about between 15° and 35°. A controlled shear gap is defined between the whipper surface and the housing to provide a sufficient flow rate and energy transfer to the mixture for a desired foaming effect. The perpendicular shear gap has a width of about between 0.4 to 1.1 mm. A motor is in driving association with the whipper for rotating the whipper about the axis at a speed sufficient for aerating and frothing the product. Additionally, a product exit conduit disposed downstream of the whipper and configured for dispensing the product of the fluid and second components.

In the preferred embodiment the second diameter of the whipper rotor is at least about 10% larger than the first diameter. More preferably, the second diameter is between about 1.25 and 2.5 times the size of the first diameter. The preferred axial length of the whipper surface about between a quarter and twice the size of the first diameter.

Also, the motor and whipper of the preferred embodiment are configured for providing an energy dissipation to the product of about between 1 J/g and 2.5 J/g with a product flow rate of about between 5 g/sec and 30 g/sec. The energy dissipation is preferably selectively in at least the range of about 0.5 J/g to 1.5 J/g with a product flow rate of about between 5 g/sec and 30 g/sec.

The conical surface of this embodiment has a substantially constant surface angle between the first and second end portions, but the surface angle can vary along the length of the whipper surface. A whipper housing preferably has a shape corresponding to the whipper surface. In addition, the whipper surface of one embodiment defines grooves extending between the first and second ends.

To obtain the frothing effect desired, and depending on the mixture of components fed into the device, a preferred motor controller is configured for selective operation at various speeds. In one embodiment, the motor controller is configured for varying the rotation speed of the motor between first and second speeds during the production of a single product.

A first wall member is preferably disposed downstream of and facing the second end of the whipper in a preferred embodiment. The first wall member is spaced from the second end by about between 0.25 mm and 5 mm, and more preferably by about between 1 mm and 3 mm. In the preferred embodiment, the first wall member includes at least one rib extending radially with respect to the axis and protruding towards the whipper and configured for increasing the efficiency of the frothing of the product. Preferably, a plurality of ribs is provided, and more preferably, there are between two and eight ribs to increase efficiency in frothing. The preferred height of the ribs from the back wall of the wall member is about between 0.5 mm and 4 mm, and preferably the ribs are spaced from the second end by about between 0.25 mm and 5 mm. The back wall itself is preferably sloped away from the whipper in a radially outward direction to improve the outwards radial flow of the product.

The preferred embodiment includes a support member configured for supporting the input container. The support member may include a mounting member attachable to a support wall or other support element. The support member also preferably includes a second bayonet attachment portion configured for releasably engaging a first bayonet attachment portion of the input container to attach the input container to the support member. Preferably, one of the bayonet attachment portions comprises a cam ramp, and the other comprises a latch. A resilient member is preferably associated with the input container and support member for biasing the input container away from the support member when the bayonet attachments are released from each other to facilitate the separation of these parts. This arrangement allows easy removal and replacement of the input container for clearing.

To prepare a beverage, a user preferably introduces milk powder and a diluent into a shear gap defined adjacent a tapered whipper surface that has an axis and that extends between first and second surface ends. The first surface end in this preferred method has a first diameter of at least about 18 mm, and the second surface end is disposed downstream of the first surface end and has a second diameter that is larger than the first diameter. The whipper surface is oriented at a surface angle to the axis of less than 90° to extend the whipping surface with a sufficient length and surface area to provide a high frothing efficiency. The whipper is rotated to mix, aerate, and froth the milk powder and diluent to produce a frothed beverage having a ratio of froth volume to liquid volume of at least about 60%. The milk powder may comprise, for example, a medium heat milk powder, preferably a skim milk powder.

DETAILED DESCRIPTION OF THE PREFERRED EMBODIMENTS

Figure 1:
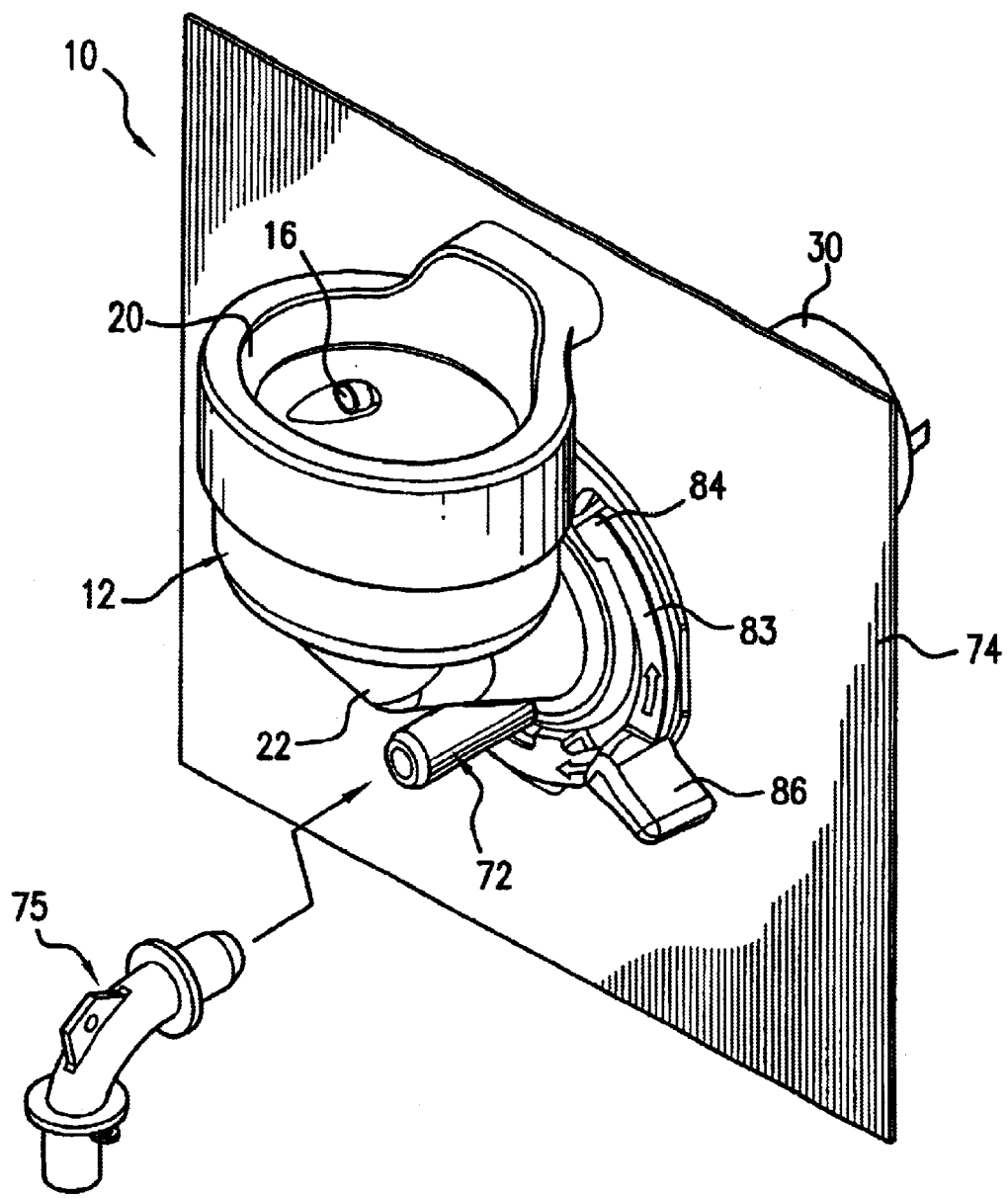
FIG. 1 is a perspective view of a preferred embodiment of the invention.
Figure 2:
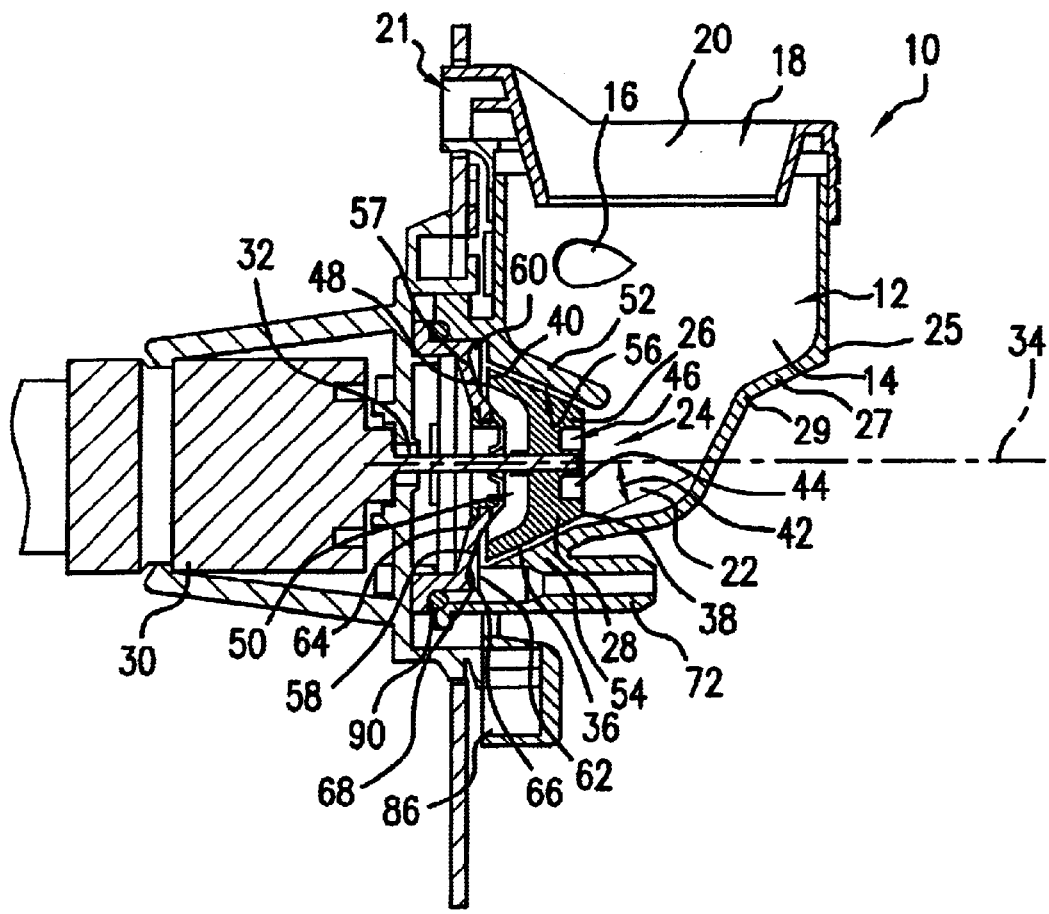
FIG. 2 is a cross-sectional view thereof.

Referring to FIGS. 1 and 2, a preferred embodiment of the invention is a mixing device 10 that includes an input container 12. The input container 12 comprises a bowl portion 14 with a tangential inlet 16 for feeding a fluid under pressure. An automatically controlled valve is preferably provided to control the fluid flow into the input container 12. The fluid is introduced through the inlet at a speed selected to produce a swirling flow, preferably substantially a whirlpool effect.

A component to be mixed with the fluid, preferably a powdered food substance, is fed into powder inlet 18, which preferably includes an opening at the top of the bowl portion 14. The powder can be fed by hand or automatically by a powder source, preferably disposed above the device 10. The powder source preferably has a dosing mechanism, such as a dosing screw, to automatically dose a predetermined amount of powder into the input container 12. A lip 20 extends around the interior of the powder inlet 18, protruding into the bowl portion 14 to prevent the swirling fluid from exiting the input container 12 by the upper side thereof. A suction is applied to orifice 21, connected to the underside of the lip 20 for extracting any splashed material. The powder inlet is sufficiently large to receive the powder poured therein and also to receive a sufficient amount of air for mixing with the fluid and component.

In the embodiment shown, a throat portion 22 of the input container 12 is disposed below the bowl portion 14. The throat portion 22 preferably has a narrower diameter than the bowl portion 14 and has a throat opening 24 disposed on a lateral side, as shown in FIG. 2. The throat portion 22 is preferably generally coaxial with the bowl portion 14 and narrows substantially evenly along the axis of the bowl portion 14. This improves the fluid flow therein and reduces any trapping of powder. Preferably, a transition between the bowl portion 14 and the throat portion 22 has an inward bend 25, followed by a sloped portion 27, which is followed by an outward bend 29, in cross-section.

Figure 3:
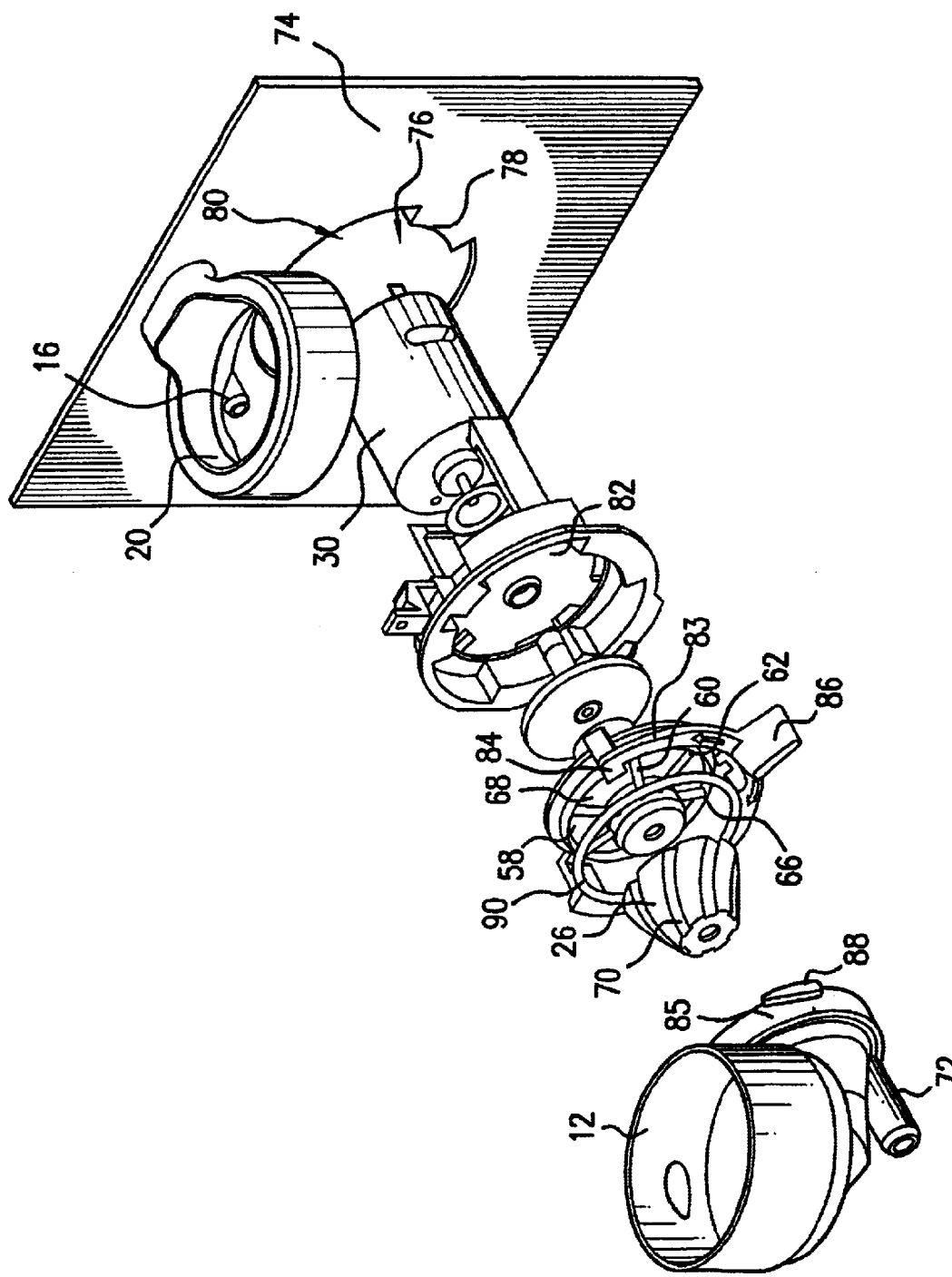
FIG. 3 is an exploded view thereof.

Referring to FIGS. 2 and 3, a whipper assembly 26 is in fluid communication with the input container, preferably at the throat opening. The whipper assembly includes a whipper rotor 28. A motor 30 drives rotor shaft 32, which drives the whipper rotor 28 so that the motor 30 drives the whipper at about whipper axis 34. A motor controller is preferably provided to control the operation and speed of the motor 30.

The preferred whipper rotor 28 has a conical whipper surface 36. The conical surface 36 preferably faces outwardly with respect to the whipper axis 34 and can have a substantially straight cross-section, as in the embodiment shown, or can be curved in cross-section with a taper angle that varies along the axial length of the whipper rotor 28. The whipper surface in the embodiment shown extends at a surface angle 42 to the whipper axis 34. Surface angle 42 is the average angle between first and second surface endportions 38, 40, and the whipper surface 36 is preferably substantially continous about its circumference between the end portions 38, 40. The angle may change beyond the end portions 38, 40. Surface angle 42 is preferably about between 5° and 65°, more preferably about between 10° and 45°, still more preferably about between 15° and 35°, and most preferably about between 20° and 30°.

The preferred whipper surface 36 extends substantially between first and second end portions 38, 40. As the whipper surface 36 is conical or tapered, the first surface end portion 38 has a smaller diameter than the second surface end portion 40. The first end portion 38 preferably faces the interior of the input container 12, with the second end portion 40 disposed on an opposite side of the whipper surface 36. In the preferred embodiment, diameter of the second end portion 40 is at least about 10% the first end portion 38 diameter. More preferably, second end portion diameter is about between 1.25 and 2.5 times the size of the first diameter. The whipper surface 36 preferably has an axial length of about between a quarter and twice the size of the first end portion diameter. In one embodiment, the first end portion diameter is about between 18 to 25 mm, and the second end portion diameter is about between 30 and 35 mm, with an axial length between the end portions of between about 10 and 25 mm. The diameters of the whipper rotor, including of the end portions are preferably measured to widest point at the station being measured along the axis 34. Thus, the diameter of a rotor with protrusions, such as ribs, is measured to the tip of the protrusions. Preferably, however, any protrusions of grooves on the surface are not deeper than about 6 mm in the preferred embodiment.

The whipper surface preferably has a surface area of at least about 800 mm$^2$ and more preferably at least about 100 mm$^2$, and preferably at most about 3000 mm$^2$ and more preferably at most about 2000 mm$^2$. This surface area is calculated taking the cross-sections of the surface as being circular relevant axial stations as described above.

Additionally, in the embodiment shown, the surface end portions 38, 40 are located at the extreme ends of the frustoconical whipper rotor 28. In other embodiments, the surface end portions may me located remotely from the ends of the whipper. In one embodiment, the first, smaller surface end 38 is defined as being at the portion of the tapered whipper rotor where the diameter becomes at least about 18 mm. Thus, this embodiment has a whipper surface measured from the location on the whipper rotor where the diameter becomes at least about 18 mm. This alternative embodiment may also have a second surface portion of the whipper rotor that extends in the direction away from the second end, and which can be continuous and can follow the adjacent whipper surface. The second surface portion may extend to the most upstream end of the whipper rotor. In another embodiment, the surface portion is measured from the location on the whipper rotor where the diameter becomes at least about 20 mm, and in yet another embodiment, it is measured from the location on the whipper rotor where the diameter becomes at least about 25 mm.

In the preferred embodiment, first or front whipper face 44 preferably defines a recessed portion 46, preferably in the shape of an annular groove, facing the interior of the input container 12. A second or rear whipper face 48 also preferably includes a recessed portion 50 facing in an opposite direction from the front face 44. In the drawings, the first and second whipper faces are disposed at the first and second surface ends 38, 40. In the alternative embodiment described in which one or both of the surface ends is located remotely from the end of the whipper rotor itself, one or both of the surface ends and the whipper faces, respectively, are also disposed remotely from each other.

The whipper rotor 28 is disposed within a whipper housing 52, which in the embodiment shown is integral part of unitary construction with the input container 12. The preferred whipper housing 52 has an inner housing surface 54 with a shape substantially corresponding to the whipper surface 36. A shear gap 56 is defined between the housing whipper surfaces 54, 36 that has a width selected to provide a sufficient flow rate and energy transfer to the mixture, for a desired foaming effect. Measured in a direction parallel to the whipper axis, 34, the shear gap 56 is preferably at least about 0.5 mm, more preferably at least about 0.8 mm, and most preferably at least 1 mm. Measures in this direction, the shear gap 56 is preferably at most about 2.5 mm and more preferably at most about 1.5 mm. One embodiment has a shear gap in this range with a surface angle 42 of about 25°. In a direction orthogonal to the whipper surface 36, the preferred size of the perpendicular shear gap is at least about 0.4 mm, and at most about 1.1 mm. The conical shape of the whipper rotor 28 provides a long shear gap 56 for acting on the fluid mixture, while providing a pumping action and without requiring an extremely large radius.

As shown in FIG. 3, the whipper rotor surface 36 preferably defines a plurality of rounded grooves 70, preferably extending between the first and second end portions 38, 40. The preferred grooves 70 are twisted to spiral along the length of the whipper rotor 28. The grooves 70 of the present embodiment are about between 0.5 and 3 mm deep. The grooves 70 are preferably configured and dimensioned for increasing the frothing action of the fluid mixture. In an alternative embodiment, the grooves are substantially aligned with the whipper axis 34, and in another embodiment, there are no grooves. The motor can turn the whipper rotor 28 in or against the direction of the grooves depending on the pumping and frothing effect desired.

A wall member 57 includes a back wall 58 is disposed behind the whipper rotor, facing the second end 40 portion and the rear whipper face 48. The preferred back wall 58 includes protrusions, which are preferably at least one rib 60 that protrude towards the whipper rotor 28. The ribs 60 in the embodiment shown extend radially substantially in a straight line, with substantially uniform thickness. In another embodiment, the ribs can extend along curved lines.

Preferably, the back wall 58 has at least two ribs 60, and more preferably it has more than two ribs 60. The back wall 58 preferably has up to eight ribs 60, and more preferably up to six ribs 60. The forward side 62 of the ribs 60 facing the whipper rotor 28 preferably has a rounded cross-section, although other shapes may be suitable as well. Additionally, the rib forward edge 62 of the illustrated embodiment is substantially straight when viewed from the side, as in FIG. 2, which shows a cut parallel to the longitudinal or radial length of the ribs 60. In alternative embodiments, the ribs 60 may generally follow the shape of the back wall 58 or may have a different shape.

The preferred back wall 58 itself is not flat, but is substantially flat in a alternative embodiment. A central portion 64 of the back wall 58 shown extends in the direction of the whipper rotor 28 and is sloped away from the whipper rotor 28 towards the radial edge portion 66 of the back wall 58. The sloped portion 68 shown extends from the central portion 64 over most of the radius of the back wall 58. Preferably, the sloped portion 68 extends beyond the radius of the second end portion 40 of the whipper rotor 28, or the portion of the whipper rotor 28 that is unobstructed with respect to the back wall 58. The radial edge portion 66 of the back wall 58 in contact with the fluid is preferably curved along a radial cross-section to slope in a reverse direction from the sloped portion 68. This curvature and reverse slope of the radial edge portion 66 substantially reduces or preferably substantially eliminates sharp angles in which the fluid will be trapped or restricted. The combination of the slopes of the sloped portion 68 and radial edge portion 66 improves the efficiency of the fluid flow.

The whipper rotor 28 is preferably spaced from the wall member 57. In the preferred embodiment, the second end portion 40 of the whipper rotor 28 is spaced from the rib forward edge 62 by at least about 0.25 mm, more preferably at least about 0.5 mm, and most preferably at least about 1 mm. The spacing between the whipper rotor 28 and the rib forward edge 62 is preferably at most about 5 mm, more preferably at most about 4 mm, and most preferably at most about 3 mm. The most preferred embodiment has a spacing of about 1.5 mm. This spacing is selected to limit and control the bubble size of air that is aerated into the fluid mixture. The height of the ribs 60 from the back wall 58 substantially adjacent the shear gap 56 is preferably at least about 0.5 mm, more preferably at lest about 1 mm, and most preferably at least about 1.5 mm. The rib height is preferably at most about 4 mm, more preferably at most about 3 mm, and most preferably at most about 2.5 mm.

The back wall 58 preferably has a larger outer diameter than the whipper rotor 28, preferably at least about 10% larger and more preferably at least about 20% larger, and most preferably at most about 60% larger, and more preferably at most about 40% larger. The outer diameter of the back wall 58 of the preferred embodiment is at least about 40 mm and at most about 60 mm. The preferred volume between the back wall 58 and the whipper rotor 28 is about between 2 ml and 12 ml, and more preferably about between 4 ml and 7 ml.

A product exit tube 72 is disposed downstream of the whipper rotor 28 and back wall 58 and is disposed to dispense the foamed fluid mixture. The product exit tube 72 is shown as an integral part of unitary construction with the input container 12. The product exit tube 72 preferably comprises a conduit with a diameter selected according to the final product that is to be dispensed. The preferred product exit tube 72 has an internal diameter of about between 2 mm and 5 mm for embodiments intended to prepare several different milk and coffee beverages. Embodiments intended primarily for coffee preferably have a product exit tube 72 with an internal diameter of about between 1 mm and 3 mm, and in embodiments intended primarily for milk, the internal diameter is preferably from about 4 mm to 8 mm. The diameter of the product exit tube 72 is selected to obtain the desired pumping performance from the whipper rotor 28. Increasing the diameter of the conduit allows a faster flow, while decreasing the diameter provides more back-pressure to retain the fluid mixture in the whipper assembly and input chamber 12 for a longer time. A dispensing spout 75 is preferably attached at the end of the product exit tube 72 for easier dispensing into a cup.

A seal, such as o-ring 90, seals the space between the input container 12 and the wall member 57 and product exit tube 72 area. A drainage channel 73 behind and below the o-ring 90 is also provided to keep any fluid that leaked past the o-ring 90 from contacting the motor 30.

Referring to FIG. 3, the preferred embodiment has a support structure that comprises a support wall 74 that is disposed substantially vertically. The support wall 74 defines an opening 76 that is contoured and configured for attaching and supporting the motor 30 mostly on one side of the support wall 74, and the product handling portion of the device, including the input container 12, the whipper rotor 28, and the product exit tube 72. Tabs 78 and recesses 80 in the opening 76 correspond with the shape of the mounting member 82, which mounts to the support wall 74 and which supports and attaches most of the elements of the device to the support wall 74. The corresponding slopes help stabilize the elements and prevents rotation.

A quick-release/attach mechanism is preferably provided and, in the embodiment shown, includes a retaining member 83, that comprises a latch member 84 that preferably slides along the mounting member 82 in a curved motion around input base 85 of the input container 12, which has an axis that is parallel to the whipper axis 34. The embodiment shown is configured as a bayonet locking mechanism. The latch member 84 includes a handle 86 to enable a user to move the latch member 84 between release and locking positions, in which the input chamber is released or locked to the mounting member 82, respectively. The input chamber preferably has at least one and preferably two or three cam ramps 88 disposed and configured for camming by the latch member 84 as the latch member 84 is moved from the release to the locking position. A resilient or spring member, such as o-ring 90, is configured for and associated with the mounting member and the input container 12 for biasing the input container away 12 from the mounting member 82 so that upon releasing the bayonet mechanism the spring member moves the input container away from the mounting member. This system allows a user to easily access the input container 12, whipper rotor 28, and back wall 58 for cleaning, preferably without requiring substantial rotation of the input container 12 itself. Other quick release mechanisms are suitable for embodiments of the invention, such as other latching mechanisms in which the latches move along a differently shaped path, and in which the latches are received in receptacles. Also, the movable portion for locking the input container to the remainder of the structure can be mounted to the input container or another part of the device.

In use, the fluid is tangentially introduced into the input container 12 through tangential inlet 16. In the preferred embodiment, the fluid comprises water, and the flow rate is about between 3 mL/sec and 30 mL/sec, more preferably about between 5 mL/sec and 15 mL/sec, and most preferably about between 9 mL/sec and 12 mL/sec. At the time or preferably after the water flow into the input container 12 is commenced, a powdered food component, such as a powdered coffee product and/or powdered milk, is dosed into the water through powder inlet 18. Preferably the powder dosing begins at least about 0.1 sec after the water dosing begins and more preferably at least about 0.3 sec. later, and preferably at most about 3 sec later, and more preferably at most about 1.0 sec later. Preferably the water is continued to be fed into the input container 12 until the powder dosing is stopped, and preferably at most about 8 sec after the powder dosing ends, and more preferably at most about 3 sec later, and preferably at least about 1.0 sec later.

The water and powder start getting mixed in the swirling flow within the input container 12, including the throat portion 22. The whipper rotor 28 is rotated by the motor 30 at a speed sufficient for pumping the mixture towards the product exit tube 72 and for producing the desired foaming and aeration effect. The whipper rotor 12 sucks in air for incorporation into the mixture. The configuration and location of the back wall 58 with respect to the whipper rotor 28 continued the frothing effect, increasing the efficiency of the device. The rotation of the whipper rotor 28 and the shape of the back wall 58 centrifugally keep the fluid product from accumulating behind the whipper rotor. The speed of the whipper rotor 12 is preferably variable to enable a speed selection to deliver the desired amount of energy to the mixture to produce the desired frothing. For obtaining products of certain qualities, the rotation speed of the whipper rotor 28 is varied between two or more speeds during the preparation of a single product. Table 1 shows the preferred approximate energy dissipation and foam values from the device 10 for the listed products. The foam value is the volume ratio of foam to liquid in the resulting product. The coffee, espresso, and foamed coffee in the table are made from soluble coffee. The plain milk, hot milk, and milk froth are reconstituted from soluble milk or creamer. The milk froth is made from a medium heat milk powder, which is known in the art and is made by heat treating skim milk at 85° C. to 102° C. for between one and two minutes and then spray drying the heat treated milk or treated with an equivalent process. The quantity of undenutured serum protein (whey protein) is between 1.5 and 6 mg per gram of the medium heat milk powder.

TABLE 1

| Product | Whipper Rotor (rpm) | Energy Dissipation (J/mL) | Foam Value (foam vol./ liquid vol.) |
| --- | --- | --- | --- |
| Plain coffee | 1,000–2,000 | 0.1–0.2 | 0%–5% |
| Coffee | 3,500–4,500 | 0.2–0.4 | 10%–15% |
| Espresso | 5,000–8,000 | 0.4–0.7 | about 30% |
| Foamed coffee | 9,000–20,000 | 0.8–2.5 | 40%–120% |
| Plain milk | 2,000–4,000 | 0.1–0.3 | 0%–5% |
| Hot milk | 4,000–9,000 | 0.3–0.8 | 20%–40% |
| Milk froth | 10,000–15,000 | 1–2.5 | 60%–120% |

The device 10 provides a high specific energy dissipation to generate a milk froth and a moderately low specific energy dissipation to obtain a high quality coffee crema in the same unit. The frothed product is then dispensed through the product exit tube 72.

It has been found that to generate an authentic quality milk froth when using a milk powder in a beverage dispenser, the specific energy dissipation should be above about 1 J/g of product, which includes milk powder and water together. Authentic milk froth as referred to in the present application is a frothed product with at least an equal volume of milk foam compared to the volume of liquid. The milk foam in the product having authentic milk froth preferably has a density of about between 50 g/mL and 300 g/mL. An authentic cappuccino can be made with the device of the present invention, which has a volume made up by about ⅓ coffee, about ⅓ frothed milk foam, and about ⅓ of milk that remained liquid after frothing. The preferred milk fraction in the authentic cappuccino has a volume that is at least as large as the volume of the liquid portion. The foam of the frothed milk in the final prepared beverage product is preferably stable, having at least about ⅔ of the foam volume remaining after 10 minutes.

The energy dissipation of the device can be controlled by adjusting the shear gap, rotor speed, and product flow rate, although these quantities are interdependent. A reduction in the shear gap, an increase in rotor speed, and a decrease in flow rate will provide a higher energy dissipation. The preferred flow rate is between at least about 5 g/sec and up to about 30 g/sec, and more preferably at least about 8 g/sec and up to about 15 g/sec. If the size of the gap is reduced, the flow rates will correspondingly be reduced and the amount of air drawn into the gap will be reduced as well, reducing foaming and aeration, and friction is increased. Also, if rpm is increased, noise and cost of the machine will increase as well.

The preferred embodiments described above allow a device of compact size, and with a desirable flow rate for preparing individual drinks to be provided without requiring extremely high rotor speeds, such as of above about 30,000 rpm. The preferred rpm used for foamed coffee or milk froth are at most about 25,000, and more preferably at most about 22,000. At these rotation speeds, the principal effective portion of the whipper rotor is that part of diameter of about 18 mm or greater.

While illustrative embodiments of the invention are disclosed herein, it will be appreciated that numerous modifications and other embodiments may be devised by those skilled in the art. For example, the whipper rotor may have an inward facing whipper surface and rotate with respect to a portion of the whipper housing that extends inside the whipper. Therefore, it will be understood that the appended claims are intended to cover all such modifications and embodiments that come within the spirit and scope of the present invention.

What is claimed is:

1. A mixing device, comprising:
   an input container configured for receiving a product that comprises a fluid component and a second component;
   a whipper having a tapered whipper surface that has an axis and that is configured for aerating and frothing the product, the whipper surface extending between first and second surface ends, the first surface end having a first diameter of at least about 18 mm and being in fluid communication with the input container to receive the product, and the second surface end being disposed downstream of the first surface end and having a second diameter that is larger than the first diameter, wherein the whipper surface is oriented at a surface angle to the axis of less than 90° to extend the whipping surface with a sufficient length and surface area to provide a high frothing efficiency;
   a motor in driving association with the whipper for rotating the whipper about the axis at a speed sufficient for aerating and frothing the product; and
   a product exit conduit disposed downstream of the whipper and configured for dispensing the product of the fluid and second components.

2. The mixing device of claim 1, wherein the motor and whipper are configured for providing an energy dissipation to the product of about between 1 J/g and 2.5 J/g with a product flow rate of about between 5 g/sec and 30 g/sec.

3. The mixing device of claim 1, wherein the motor and whipper are configured for providing an energy dissipation to the product selectively in at least the range of about 0.5 J/g to 1.5 J/g with a product flow rate of about between 5 g/sec and 30 g/sec.

4. The mixing device of claim 1, wherein the surface angle is about between 5° and 65°.

5. The mixing device of claim 4, wherein the whipper surface has an area of about between 1000 mm² and 3000 mm².

6. The mixing device of claim 1, wherein the surface angle is about between 10° and 45°.

7. The mixing device of claim 1, wherein the whipper surface has an axial length of about between a quarter and twice the size of the first diameter.

8. The mixing device of claim 1, wherein the conical surface has a substantially constant surface angle between the first and second end portions.

9. The mixing device of claim 1, wherein the whipper housing has a shape substantially corresponding to the whipper surface.

10. The mixing device of claim 9, wherein a shear gap is defined between the housing and the whipper rotor, orthogonal to the whipper surface, having a width of about between 0.4 mm and 1.1 mm.

11. The mixing device of claim 1, wherein the whipper surface defines grooves extending between the first and second ends and having a depth of at most about 6 mm.

12. The mixing device of claim 1, further comprising a first wall member disposed downstream of and facing the second end, the first wall member being spaced from the second end by about between 0.25 mm and 5 mm.

13. The mixing device of claim 12, wherein the first wall is spaced from the second end by about between 1 mm and 3 mm.

14. The mixing device of claim 1, further comprising a motor controller configured for selective operation at various speeds.

15. The mixing device of claim 14, wherein the motor controller is configured for varying the rotation speed of the motor between first and second speeds during the production of a single product.

16. A mixing device, comprising:
    an input container configured for receiving a product that comprises a fluid component and a second component;
    a whipper in fluid communication with the input container to receive the product and configured for mixing and frothing the product;
    a motor in driving association with the whipper for rotating the whipper about the axis at a speed sufficient for mixing and frothing the product;
    a first wall member disposed downstream of, facing, and spaced from the whipper, the first wall member comprising at least one rib extending radially with respect to the axis and protruding towards the whipper, the rib being configured for increasing the efficiency of the frothing of the product; and
    a product exit conduit disposed downstream of the whipper and configured for dispensing the product of the fluid and second components.

17. The mixing device of claim 16, wherein the at least one rib comprises between 2 and 8 ribs.

18. The mixing device of claim 16, wherein the wall portion comprises a back wall facing the whipper, and the rib has a height from the back wall of about between 0.5 mm and 4 mm.

19. The mixing device of claim 16, wherein the rib is spaced from the second end by about between 0.25 mm and 5 mm.

20. The mixing device of claim 16, wherein the first wall member is sloped away from the whipper in a radially outward direction for improving the outwards radial flow of the product.

21. The mixing device of claim 16, wherein the whipper comprises a conical whipper surface that has an axis and that is configured for aerating and frothing the product, the whipper surface extending between first and second end portions, the first end portion having a first diameter and being in fluid communication with the input container to receive the product, and the second end portion being disposed downstream of the first end portion and having a second diameter that is larger than the first diameter, wherein the whipper surface is oriented at a surface angle to the axis of about between 5° and 65°.

22. A method of preparing a frothy beverage, comprising:

introducing milk powder and a diluent into a shear gap defined adjacent a tapered whipper surface that has an axis and that extends between first and second surface ends, the first surface end having a first diameter of at least about 18 mm, and the second surface end being disposed downstream of the first surface end and having a second diameter that is larger than the first diameter, the whipper surface being oriented at a surface angle to the axis of les than 90° to extend the whipping surface with a sufficient length and surface area to provide a high frothing efficiency;

rotating the whipper surface to mix, aerate, and froth the milk powder and diluent to produce a frothed beverage having a ratio of froth volume to liquid volume of at least about 60%.

23. The method of claim 22, further comprising the shear gap, whipper surface, and rotation speed of the whipper surface for providing an energy dissipation to the product of about between 1 J/g and 2.5 J/g with a product flow rate of about between 5 g/sec and 30 g/sec.

24. The method of claim 22, wherein the milk powder comprises a medium heat milk powder.

25. The method of claim 22, wherein the milk powder comprises a skim milk powder.

* * * * *